United States Patent [19]

Donavich

[11] Patent Number: 4,884,496
[45] Date of Patent: Dec. 5, 1989

[54] SLIDING RIB SIDING FOR REFRIGERATED TRAILERS AND THE LIKE

[75] Inventor: John X. Donavich, Carterville, Ill.

[73] Assignee: Transamerica Interway, Inc., Del.

[21] Appl. No.: 305,460

[22] Filed: Feb. 1, 1989

[51] Int. Cl.$^4$ ............................................. B60P 3/20
[52] U.S. Cl. ......................................... 98/6; 62/239; 410/40
[58] Field of Search .................. 62/239; 98/6; 410/34, 410/39, 40; 296/24.1

[56] References Cited

U.S. PATENT DOCUMENTS

| | | | |
|---|---|---|---|
| 593,674 | 11/1897 | Mather . | |
| 1,294,503 | 2/1919 | McMahen | 98/6 |
| 1,898,195 | 2/1933 | Lorenz . | |
| 1,950,316 | 3/1934 | Lorenz | 105/423 |
| 1,957,450 | 5/1934 | Fitch | 98/6 |
| 2,083,286 | 6/1937 | Banning, Jr. | 98/6 X |
| 2,155,872 | 4/1939 | Reifer et al. | 105/369 |
| 2,289,489 | 7/1942 | Ennis | 105/423 |
| 2,544,242 | 3/1951 | Van Dorn et al. | 98/6 |
| 2,882,701 | 4/1959 | Nelson et al. | 62/405 |
| 2,923,384 | 2/1960 | Black | 98/6 |
| 3,092,220 | 6/1963 | Black | 98/6 |
| 3,206,946 | 9/1965 | Lindersmith et al. | 98/6 |
| 3,246,592 | 4/1966 | Rath . | |
| 3,308,738 | 3/1967 | Heimann | 98/6 |
| 3,673,812 | 7/1972 | Pierce | 98/6 X |
| 4,481,870 | 11/1984 | Smith | 98/6 |

*Primary Examiner*—Harold Joyce
*Attorney, Agent, or Firm*—Price, Heneveld, Cooper, De Witt & Litton

[57] ABSTRACT

A device for spacing perishable or frozen products from the sides of refrigerated trailers, containers, trucks, railroad cars and the like includes a pair of vertically spaced, elongated cables, brackets for mounting the cables to the sidewalls of the trailer and a plurality of elongated slats or ribs. The slats define upper and lower apertures through which the cables are threaded. The slats are slidably movable from a stored position in abutting relationship to an operative position spaced along the cables and the sidewalls of the trailer. The slats have a generally U-shaped cross section to define additional air channels.

19 Claims, 2 Drawing Sheets

SLIDING RIB SIDING FOR REFRIGERATED TRAILERS AND THE LIKE

BACKGROUND OF THE INVENTION

The present invention relates to refrigerated enclosures and more particularly to refrigerated trucks, trailers, containers, railroad cars and the like.

Frozen and perishable products are transported in enclosures or units such as refrigerated trailers, trucks, railroad cars, containers and the like. Generally, self-contained forced air refrigeration systems maintain the desired temperature within the unit To limit localized hot or cold spots, a relatively uniform flow of conditioned air around the cargo or load is necessary Improper air flow permits thawing of product during warm weather and freezing of the product during cold weather. In fact, the principal cause of product damage is such thawing and freezing. Various constructions have been proposed to achieve the desired flow pattern. For example, the unit may be lined with ribbed panels and a ribbed floor which define air ducts and space the cargo or load from the sides and bottom of the enclosure. Examples of trailers and the like employing permanent ribbed panels or sidewalls may be found in U.S. Pat. No. 2,289,489 entitled RAILROAD CAR INSIDE LINE and issued on Jul. 14, 1942 to Ennis; U.S. Pat. No. 2,923,384 entitled FLOOR CONSTRUCTION FOR REFRIGERATED ROADWAY VEHICLES and issued on Feb. 2, 1960 to Black; U.S. Pat. No. 3,308,738 entitled VENTILATING RIB PANELS and issued on Mar. 14, 1967 to Heimann; and U.S. Pat. No. 3,673,812 entitled BOXED PRODUCE LOAD and issued on Jul. 4, 1972 to Pierce.

Even though ribbed siding and interior liners are available, the vast majority of units for the refrigeration transportation industry are manufactured with smooth interior sidewalls. The increased manufacturing cost of the ribbed panels or interior is typically not justified in view of the substantially higher maintenance costs, repair costs and downtime.

A need exists for a transportation unit or enclosure which readily accommodates perishable or frozen products and provides the required channels or passages for proper air circulation yet permits efficient transport of dry freight and eliminates the high cost and maintenance problems heretofore experienced.

SUMMARY OF THE INVENTION

In accordance with the present invention, the aforementioned needs are substantially fulfilled. Essentially, the present invention includes a plurality of elongated ribs or slats and a mounting or support means which selectively permits positioning of the ribs in spaced relationship along the sidewalls of the refrigerated unit, container, trailer and the like to properly space the cargo or load from the sidewalls. Such support means also permits the ribs to be moved to an inoperative, out of the way position along the sidewalls for the transport of dry freight.

In the preferred form, a pair of elongated cables are stretched along the sidewalls of the enclosure. Brackets secure the cables. The slats or ribs are formed with a generally U-shaped cross section and include upper and lower apertures through which the cables are threaded. The ribs may, therefore, be slid along the cables between a stored position and an operative position. The present invention eliminates the high cost of manufacture and excessive maintenance costs and downtime previously associated with ribbed panels or sidewalls. The ribs are readily adapted to different load configurations and are in effect removable for the transport of dry freight.

DETAILED DESCRIPTION OF THE PREFERRED EMBODIMENT

Figure 1:
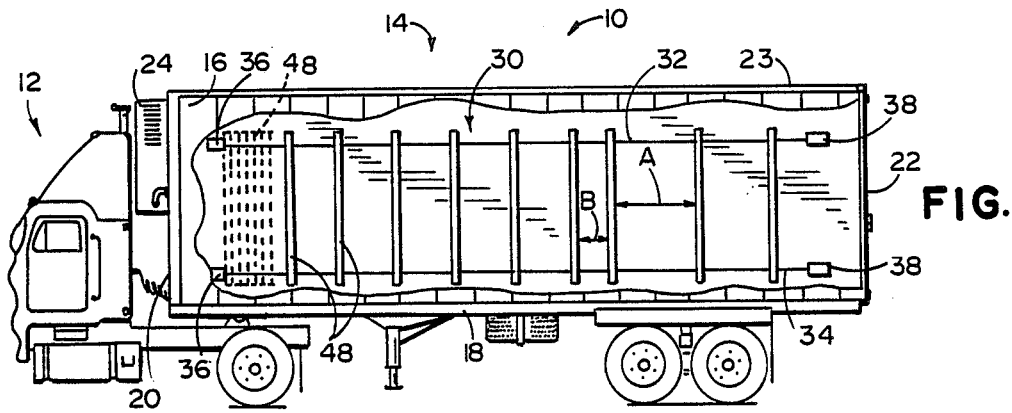
FIG. 1 is a fragmentary, side elevational view of a tractor trailer unit incorporating the present invention.

A tractor trailer unit incorporating a preferred embodiment of the present invention is illustrated in FIG. 1 and generally designated by the numeral 10. Unit 10 includes a tractor 12 and a refrigerated trailer 14. Trailer 14 includes sides 16, a bottom 18, a front 20, a rear 22 and a top or roof 23. A self-contained refrigeration unit 24 is mounted on front 20 of trailer 14. Although the present invention is illustrated in the context of a refrigerated trailer, the invention is usable with other refrigerated units, such as containers, railroad cars, trucks and the like.

In accordance with the present invention, an assembly 30 is positioned on each sidewall 16 within the interior of the trailer, unit or enclosure 14. Assembly 30 includes a pair of vertically spaced, elongated supports 32, 34. In the preferred form, supports 32, 34 are elongated, flexible cables. Cables 32, 34 are stretched tight between end brackets 36, 38. Brackets 36, 38 secure upper cable 32 to the sidewalls of the enclosure at a point spaced from the roof or top 23.

Figure 2:
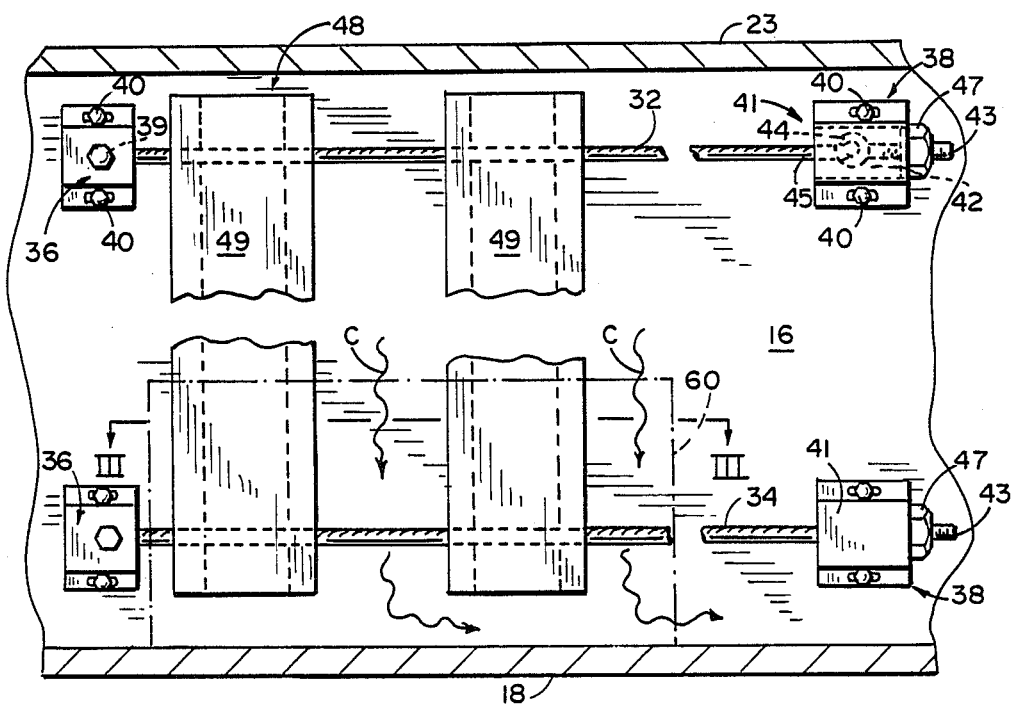
FIG. 2 is an enlarged, fragmentary, elevational view of rib siding in accordance with the present invention.

FIG. 2 illustrates one possible form for brackets 36, 38. As shown therein, brackets 36 are secured to sidewalls 16 and anchor an end 39 of each cable 32, 34. Suitable fasteners 40 may be used. Bracket 38 allows tensioning of each cable. Bracket 38 includes a body portion 41 defining a cavity 42. An eye bolt 43 is threaded to body portion 41 and eye 44 receives cable end 45. A nut 47 is threaded to bolt 43. Rotation of nut 47 moves eye bolt 43 to tension each cable. Other forms of brackets or anchor members may be used. A principal concern is providing a means for tensioning the flexible cables along the sidewall.

Figure 3:
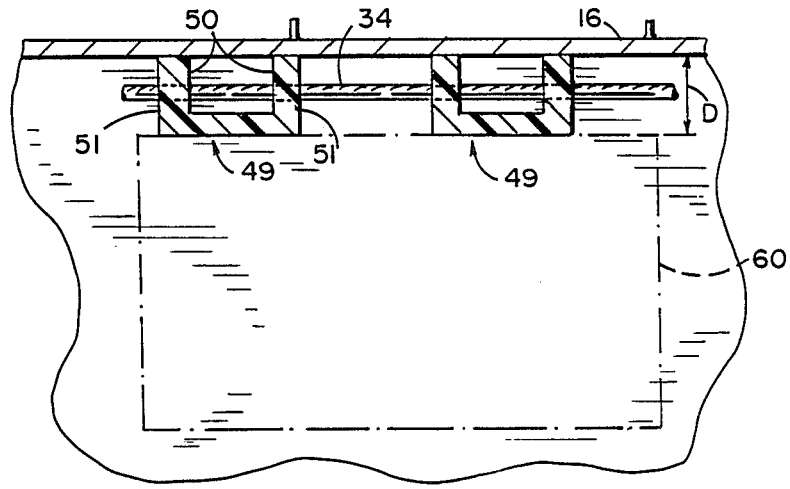
FIG. 3 is a cross-sectional view, taken generally along line III—III of FIG. 2.

Slidably or movably supported on cables 32, 34 are a plurality of vertically oriented slats or ribs 48. As seen in FIGS. 2 and 3, slats 48 are generally U-shaped in horizontal cross section and include a base 49 and sides 51. Sides 48 define aligned apertures 50. Apertures 50 are formed adjacent the upper and lower ends of the slats. The slats are supported on cables 32, 34 by threading the cables through the aligned apertures. As a result, slats or ribs 48 are slidably positionable along the cables or supports 32, 34.

In order to mount the assembly on the sidewall of the trailer, slats 48 are initially threaded onto the cables. One of the free ends of each of the cables is joined to its respective bracket 36. The brackets 36 are positioned adjacent the forward or front wall 20 of the enclosure.

When positioned, they may be secured to the sidewalls using suitable fasteners. Cables 32, 34 are then stretched tight along the sidewalls and brackets 38 affixed to the sidewalls adjacent the rear 22 of the enclosure. Nuts 47 are adjusted to tension the cables. An intermediate bracket or support hook 56 is preferably secured to a sidewall intermediate brackets 36, 38. Hook 56 supports upper cable 32. In order to permit the slats to be positioned properly along the cables, it is preferred that the bracket 56 be an open hook. The slats, as described below, are slid along the cables and then the cable is placed on support hook 56 which limits sagging.

Figure 5:
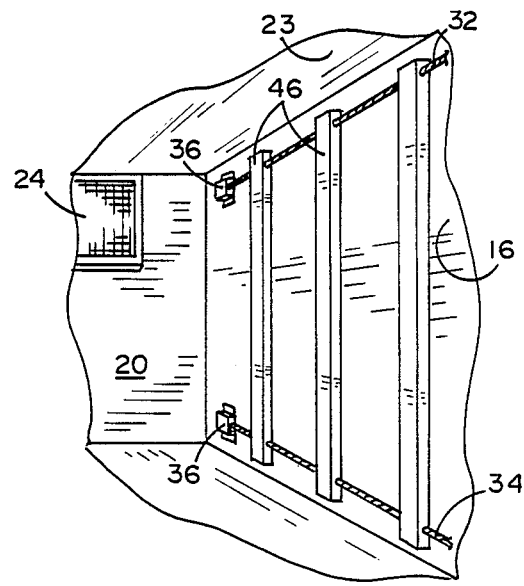
FIG. 5 is a fragmentary, perspective view with the rib siding in the operative position.

Once the device has been properly mounted on the interior sidewall of the trailer, the slats may be positioned at generally equally spaced points along the sidewalls. The spacing is selective and may be equidistant or variable as represented by the arrows A and B shown in FIG. 1. When transporting a perishable or frozen product 60 (FIGS. 2, 3 and 5, ribs 48 are positioned along the cables and space product 60 a distance D from the sidewalls 16 of the enclosure. The spacing between the ribs defines air flow channels permitting the refrigerated or conditioned air to pass freely along the sides of the product and the enclosure, as indicated by arrows C. In addition, since the ribs are U-shaped in cross section, the ribs themselves define channels for flow or ducting of air along the sidewalls.

Figure 4:
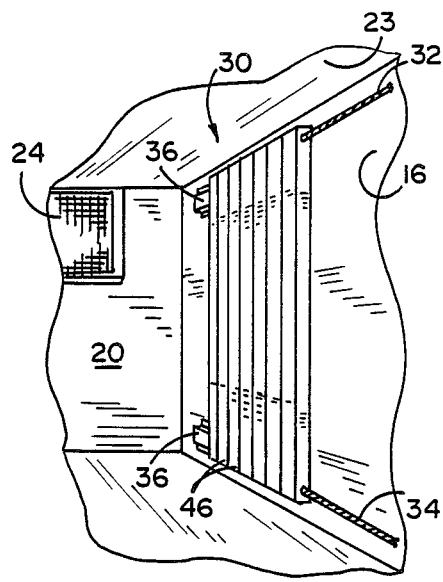
FIG. 4 is a fragmentary, perspective view of the rib siding in a stored position.

When the unit is employed to transport dry freight and refrigeration is unnecessary, the ribs may be pushed all the way forward to an inoperative position, as illustrated in FIG. 4. In this position, the slats are in abutting relationship and are essentially out of the way. The trailer or unit may be loaded with dry freight without fear of damage to or contact with the ribs.

It is presently preferred that approximately one-eighth inch diameter aviation cable be employed for supports 32, 34 and that ribs 48 be fabricated from plastic or fiberglass. The ribs are approximately six feet long, one and one-half inches wide and approximately one-half inch thick. The cables and ribs are positioned in unit 14 approximately fourteen inches from the roof and approximately twenty inches from the floor or bottom of the enclosure. When positioned to accept a perishable or frozen load, the ribs may be spaced approximately sixteen inches apart. With a standard trailer, thirty-three ribs may be used for such spacing. The number and dimensions of the ribs could, of course, vary. As presently preferred, the ribs therefore space products 60 a distance D (FIG. 3) of approximately one-half inch from the sidewalls. This spacing should provide ample and relatively uniform air flow between the product and the sidewalls of the unit. The ribs are relatively easily constructed and at substantially reduced cost than would be incurred with the fabrication of custom ribbed panels permanently mounted or defining the sidewalls of the unit. The ribs if damaged are fairly easily replaced. Substantial delays with maintenance or repairs and hence downtime for the unit are eliminated. Repair costs during the life of the trailer are minimized. Problems heretofore experienced with freezing of product during cold weather or thawing during hot weather are eliminated at a reasonable cost.

In view of the foregoing description, those of ordinary skill in the art may envision various modifications which would not depart from the inventive concepts disclosed herein. For example, supports other than cables 32, 34 such as rigid bars or tube could be used to support ribs 48. The cables are presently preferred for cost and ease of installation reasons. Also, the slats could be mounted in a horizontal orientation and still space the product from the walls. Therefore, it is expressly intended that the above description should be considered as only that of the preferred embodiment The true spirit and scope of the present invention may be determined by reference to the appended claims.

The embodiments of the invention in which an exclusive property or privilege is claimed are defined as follows.

1. A device for spacing cargo from the sidewalls of refrigerated units, said device comprising:
    an elongated support having ends;
    bracket means engaging said support ends for mounting said support to a sidewall of a unit; and
    a plurality of elongated ribs, means on said ribs and engaging said support for movably supporting said ribs on said support adjacent the sidewall of the unit, said ribs being selectively movable from a stored position to an operative position spaced along said support, whereby said ribs may be positioned to maintain cargo away from the sidewall of the unit so that air may circulate.

2. A device as defined by claim 1 wherein said means on said ribs for supporting said ribs comprises each of said ribs defines an aperture through which said support extends.

3. A device as defined by claim 2 wherein each of said ribs has a generally U-shaped horizontal cross section.

4. A device as defined by claim 1 further including another elongated support and another bracket means engaging said another support for mounting said another support in spaced, parallel relationship to said elongated support, said ribs each defining another aperture through which said another support extends, said ribs being slidably supported on said supports.

5. A device as defined by claim 4 wherein said ribs each define upper and lower apertures, said elongated support passing through said upper aperture and said another elongated support passing through said lower aperture.

6. A device as defined by claim 5 wherein each of said ribs is generally U-shaped in cross section.

7. A device as defined by claim 1 further including an intermediate bracket engaging said support intermediate its ends.

8. A device as defined by claim 6 further including an intermediate bracket engaging said support intermediate its ends.

9. A device as defined by claim 1 wherein said elongated support is a flexible cable.

10. A device as defined by claim 4 wherein said elongated supports are flexible cables.

11. A device as defined by claim 8 wherein said elongated supports are flexible cables.

12. A refrigerated container, trailer and the like for the transport of frozen products, perishable products and dry freight, comprising:
    an enclosure including a rear, a floor, a front, sidewalls and a top;
    a plurality of elongated slats; and
    support means on the sidewalls of said enclosure for adjustably supporting said slats along said sidewalls and permitting said slats to be moved to a stored position in a generally abutting relationship for the transport of dry freight and permitting said slats to be moved to an operative position in spaced, parallel relationship along the sidewalls to space product from said sidewalls and permit air circulation between the sidewalls and the product.

13. A refrigerated container, trailer and the like as defined by claim 12 wherein said slats are generally U-shaped in cross section.

14. A refrigerated container, trailer and the like as defined by claim 12 wherein said support means each comprise:
a pair of vertically spaced cables extending in generally parallel relationship from a point adjacent the front of said enclosure towards said rear; and
attachment means on said sidewalls for attaching said cables to said sidewall.

15. A refrigerated container, trailer and the like as defined by claim 14 wherein each of said slats defines upper and lower transverse openings through which said cables extend to slidably support said slats.

16. A refrigerated container, trailer and the like as defined by claim 12 wherein said slats are generally U-shaped in cross section.

17. A refrigerated container, trailer and the like as defined by claim 15 wherein said slats are generally U-shaped in cross section.

18. A refrigerated container, trailer and the like as defined by claim 14 further including an intermediate support mounted on each of said sidewalls and engaging one of said cables.

19. A refrigerated container, trailer and the like as defined by claim 17 further including an intermediate support mounted on each of said sidewalls and engaging one of said cables.

* * * * *